United States Patent [19]
Bulger et al.

[11] 4,081,033
[45] Mar. 28, 1978

[54] SLOPE CONTROL SYSTEM

[75] Inventors: Frederick J. Bulger, West Dundee, Ill.; Royal R. Hawkins, Bloomington, Minn.; Leland E. Kuntz, Arlington Heights, Ill.

[73] Assignee: Honeywell Inc., Minneapolis, Minn.

[21] Appl. No.: 758,522

[22] Filed: Jan. 11, 1977

Related U.S. Application Data

[63] Continuation of Ser. No. 408,778, Oct. 23, 1973, abandoned.

[51] Int. Cl.² .............................................. E02F 3/76
[52] U.S. Cl. ................................ 172/4.5; 37/DIG. 20
[58] Field of Search .................. 172/4.5, 430; 37/108, 37/DIG. 20; 280/6 H

[56] References Cited

U.S. PATENT DOCUMENTS

| 2,474,471 | 6/1949 | Dolan | 280/6 H X |
| 3,026,638 | 3/1962 | Hayner et al. | 172/4.5 |
| 3,229,391 | 1/1966 | Breitbarth et al. | 172/4.5 |
| 3,303,589 | 2/1967 | Rivinius | 172/4.5 |
| 3,791,452 | 2/1974 | Long et al. | 172/4.5 |

Primary Examiner—Paul T. Sewell
Attorney, Agent, or Firm—Trevor B. Joike

[57] ABSTRACT

In a slope control system for the working tool of a motor grader or other earth working machine, the slope sensor used for controlling the slope of the tool is mounted on a resolving platform below the front axle pivot of the machine to provide anticipation of the deviations of the machine from the gravity reference. The attitude of the slope sensor is corrected by a factor related to the angle of the tool with respect to the longitudinal axis of the machine.

3 Claims, 5 Drawing Figures

SLOPE CONTROL SYSTEM

This is a continuation, of application Ser. No. 408,778, filed Oct. 23, 1973, abandoned.

BACKGROUND OF THE INVENTION

The present invention concerns the automatic control of the position of the working tool of an earth working machine and, according to the preferred embodiment, the position of the blade of the motor grader. More specifically, the present invention concerns the control of the transverse slope of the working tool or blade of an earth working machine. The preferred embodiment of the invention relates to the slope control of the blade of a motor grader although it is recognized that other types of machines may be controlled by the present invention.

In view of today's highway requirements, particularly high speed travel over modern highways, the demand for greater accuracy in preparing road beds for surfacing is substantial. At the same time, the grading operation must be accomplished quickly and efficiently in order to cope with the long distances over which our today's modern highways are to stretch. The present invention provides for quick and efficient operation of a grading machine by providing automatic control and provides for a highly accurate grading operation by providing refinements in the slope control system of the automatic control.

SUMMARY OF THE INVENTION

One such refinement accurately simulates the slope of the motor grader blade. The slope angle of the motor grader blade with respect to the transverse axis of the machine changes upon rotation of the grader blade support circle when the blade circle is not level in the pitch direction as is discussed in U.S. Pat. Nos. 3,229,391 and 2,961,783. It is necessary, therefore, to introduce the rotation of the blade circle into the control system in order to effectively control the blade at the proper slope angle.

This control is accomplished in the instant invention by providing for the slope sensor, which may take the form of a pendulum, a support platform and bar assembly for correcting the attitude of the slope sensor dependent upon the blade angle with respect to the longitudinal axis of the machine.

A further refinement made in the control system in order to more accurately operate the motor grader is to lower the slope support platform below the front axle pivot point of the motor grader. This allows the control system to provide a kind of anticipation of the rolling of the machine. If the slope sensor is mounted above the front axle pivot of the machine and if the machine, when viewed from behind, rolls clockwise, the acceleration forces on the gravity sensing slope sensor are such as to cause the slope control system to compensate for the roll in the wrong direction. That is, the acceleration on the slope sensor is such as to further increase the angle by which the blade has deviated from its preset reference.

However, if the slope sensor is lowered below the front axle pivot point, the same roll of the machine will produce an acceleration force on the pendulum arm of the slope sensor in a direction to correctly realign the blade angle earlier than would have been obtained had the slope sensor been mounted above or at the front axle pivot point.

Other advantages of the present invention will be made apparent in the following specification wherein a preferred form of the invention is described by reference to the accompanying drawings.

SHORT DESCRIPTION OF THE DRAWINGS

DETAILED DESCRIPTION

Figure 1:
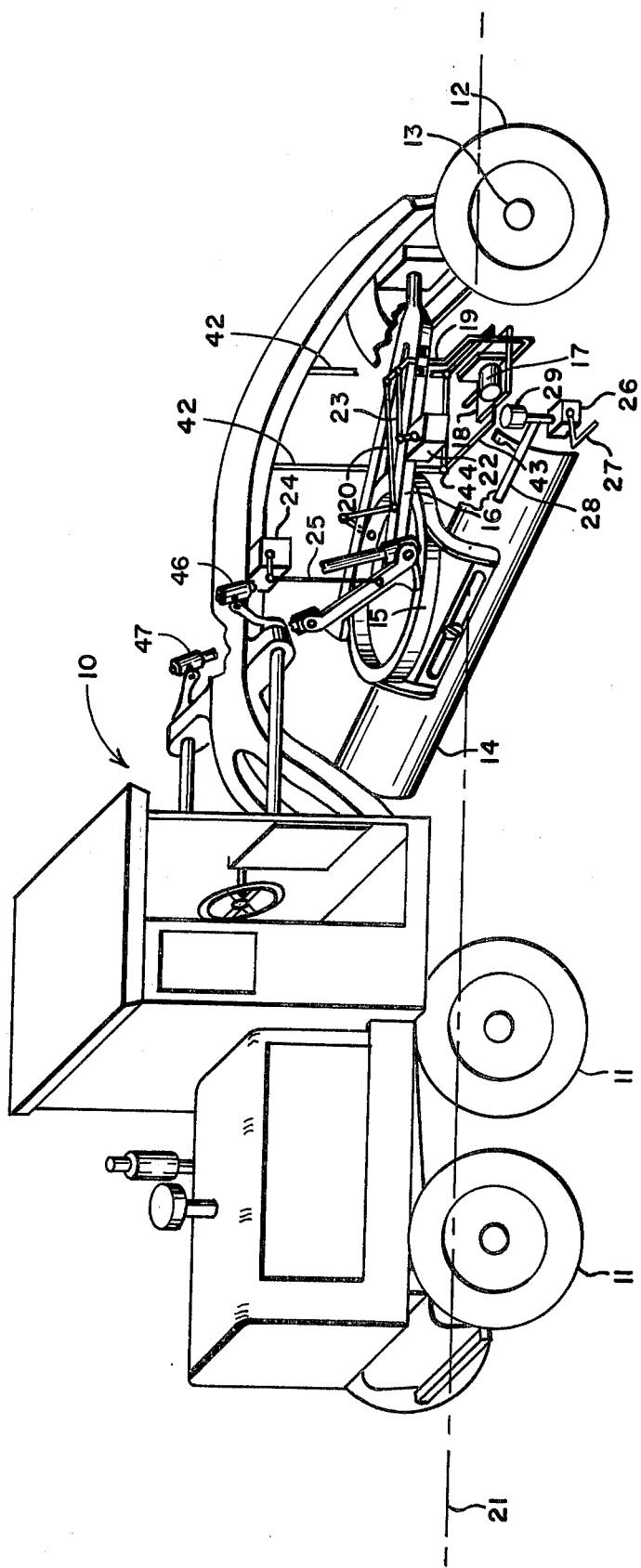
FIG. 1 is an illustration of the motor grader with the control system components mounted thereon.

In FIG. 1 there is shown a motor grader 10 having rear wheels 11 and front wheels 12. The front wheels 12 rotate about an axle 13 which is transversely pivotable around its connection to the front of the machine. The blade 14 of the machine is supported from a blade circle 15 the elevation of which is controlled by hydraulic rams 46 and 47. It is to be noted here that the hydraulic rams also control the slope of the machine blade. The circle 15 is also connected to the front of the machine by a draw bar 16.

A slope sensor 17 is mounted on a platform 18 suspended from the draw bar 16 by way of a linkage mechanism 19 and from the machine frame by struts 42 and 43. Struts 42 and 43 are pivotable with respect to each other at 44 and struts 43 are attached to the fore and aft ends of platform 18. Such a construction allows the platform vertical and roll movement but no rotational movement. The lower, horizontal bar of linkage 19 corrects the attitude or roll position of the platform 18 and thus the slope sensor 17 to account for the rotational angle of the blade (i.e. the angle of the blade with respect to the longitudinal axis 21). It is the function of the slope sensor 17 to sense the deviation of the blade from the gravity reference. The linkage 19 is connected to the blade circle 15 by further linkage 20 such that, as the blade circle rotates and positions the blade at a desired angle with respect to the longitudinal axis 21 of the machine, the linkage 19 rotates to match this angle by a correction factor applied to platform 18.

A potentiometer 22 is connected to the linkage mechanism 19 and 20 by a linkage 23 and provides an indication or electrical output depending upon the angle of the blade with respect to longitudinal axis 21. A further potentiometer 24 is connected by a potentiometer operator 25 to provide a feedback indication of the grade or elevation position of the blade.

The grade sensor 26 having a stringline follower 27 is mounted by support means 28 on the blade and provides an indication of the deviation of the blade from a preset grade reference. The height of the grade sensor 26 is adjustable by a motor 29 which may operate to establish a predetermined reference of the blade with respect to the stringline.

Figure 3:
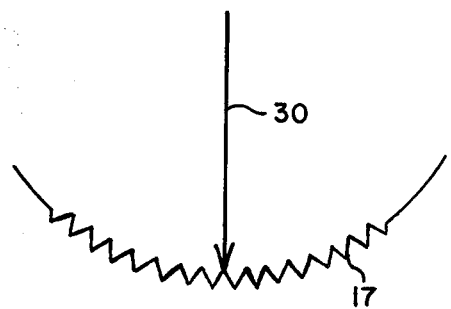
FIGS. 3–5 show the effects of the acceleration force on the slope sensor depending upon whether the sensor is mounted above or below the front axle pivot.
Figure 4:
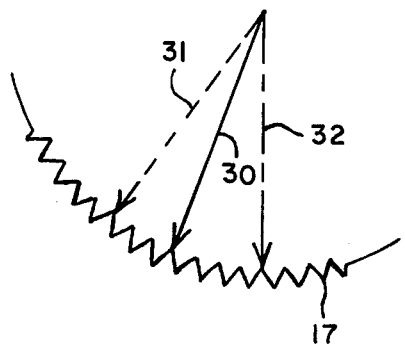

To understand the operation of the device, first assume that the slope sensor has been mounted above the front axle of the machine. In such a location, with a roll of the machine in a clockwise direction when viewed from behind the machine, the pendulum slope sensor moves from its normal position (FIG. 3) to the right (FIG. 4). The acceleration on the pendulum arm 30 of the potentiometer 17 due to the roll is such that the pendulum arm 30 moves to assume or tends to assume the position 31 to the left of its original position. Gravity will then force arm 31 to seek stable position 32. However, this position 31 is in a direction opposite that of position 32 which is the position to provide the proper corrective action. Instead of producing an error signal representing the angle between arm 30 and position 32 to readjust the blade angle into alignment, an error signal representing the angle between arm 30 and position 31 is actually obtained and this angle is in a direction to further increase the misalignment of the blade with respect to its reference. Therefore, as can be seen, with the pendulum sensor mounted above the front axis pivot point, the initial action taken by arm 30 upon a roll is in a direction to increase the blade angle error thus tending to cause the slope sensor to provide corrective action opposite to that necessary to eliminate the error signal.

Figure 5:
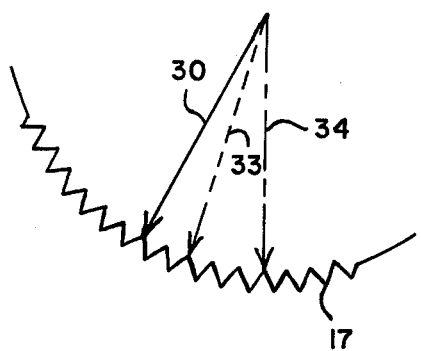

However, if the pendulum were moved below the front axle pivot and assuming again a roll in a clockwise direction when viewing the machine from the rear, FIG. 5 demonstrates the proper corrective action that the pendulum sensor takes. The acceleration on the pendulum arm 30 is such that pendulum arm 30 tends to assume position 33 upon the initial roll. Thereafter, the pendulum arm 30 moves in the same direction to position 34, gravity reference, to provide the proper error signal for the proper corrective action. It is seen from FIG. 5 that the initial movement of pendulum arm 30 is in the proper direction to provide the proper error signal. This action may be referred to as anticipation.

Figure 2:
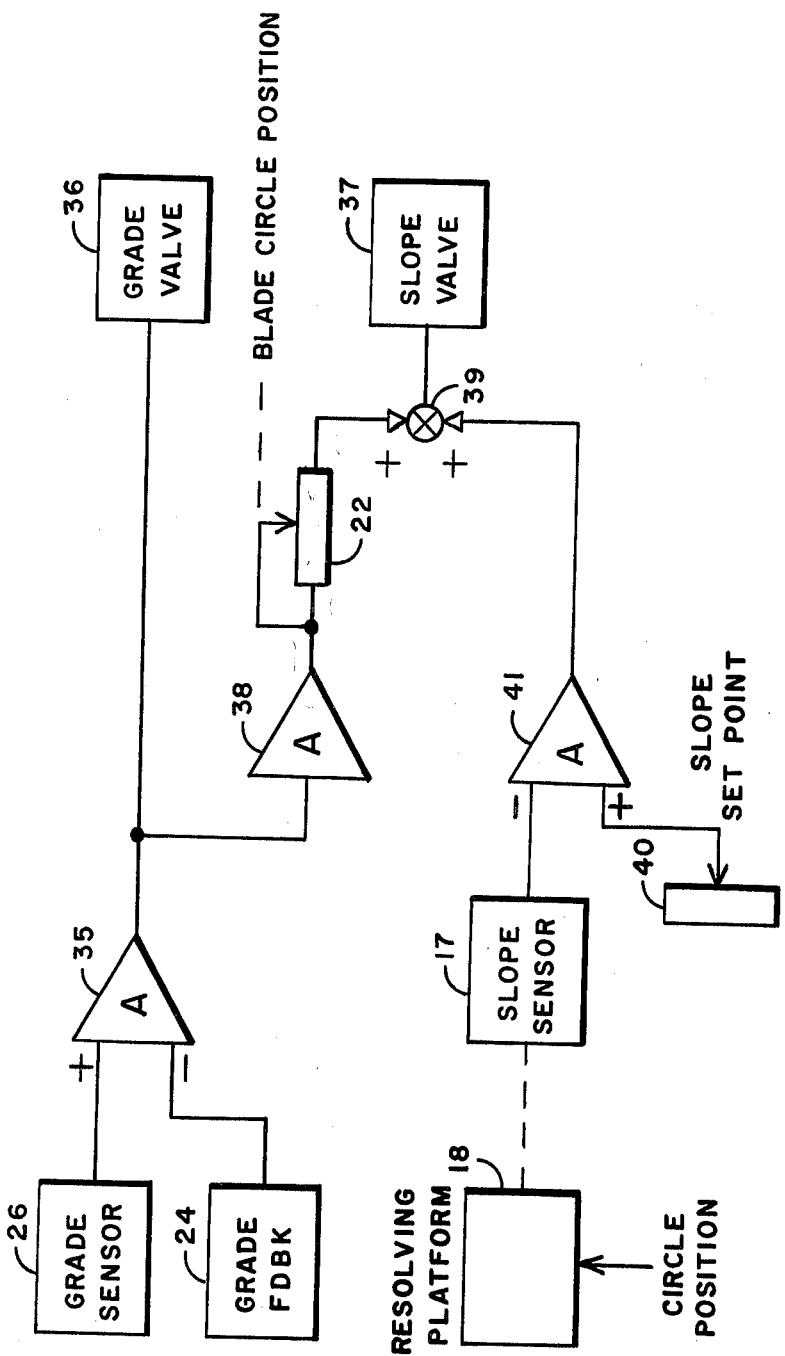
FIG. 2 is a schematic diagram of the control circuit using the invention herein.

FIG. 2 shows the control circuit provided to accomplish all of the control functions. The grade sensor 26 and the grade feedback potentiometer 24 provide signals to a comparator amplifier 35. The comparator amplifier senses the deviation between the grade sensor and the grade feedback potentiometer and provides an output signal proportional to this deviation to the grade valve 36 which controls the hydraulic ram 46 in a direction to effect grade control. The output of amplifier 35 is also amplified again by amplifier 38 and a portion of the signal as determined by the blade circle position feedback rheostat 22 is applied to summing circuit 39. Also applied to the summing circuit 39 is the slope signal. The slope signal is derived from the slope sensor 17 mounted on the resolving platform 18. Comparator amplifier 41 compares the deviation between the slope sensor and a set point as established by potentiometer 40 and provides an output proportional to the deviation. This output is applied to the summing circuit 39 which sums the signal from rheostat 22 and from amplifier 41 to provide an output to the slope valve 37 which adjusts the slope of the blade 14 of the motor grader 10 by virtue of ram 47.

The embodiments of the invention in which an exclusive property or right is claimed are defined as follows:

1. A slope control for the working tool of an earth working machine, said earth working machine having a machine frame, an adjustable means for controlling the orientation of the working tool, and a longitudinal axis, said control comprising:

slope sensor means for sensing the slope of said working tool;

means for suspending said slope sensor means from said machine for allowing said slope sensor means to move only vertically in the roll direction;

support means having one end for supporting said slope sensor means for controlling movement of said slope sensor means in said roll direction and having a second end, said support means adapted to move along with said working tool in roll and pitch directions;

linkage means for connecting said second end of said support means to said working tool to rotate said first end of said support means as said working tool rotates; and, control means responsive to said slope sensor means for controlling the slope of said working tool.

2. The control of claim 1 wherein said support means comprises a support bar having a first end upon which said slope sensor means rests, said support bar having a second end connected to said linkage means.

3. The control of claim 1 wherein said slope sensor means comprises a platform and a slope sensor mounted to said platform, wherein said first end of said support bar supports said platform and, due to said linkage means, rotates with rotation of said working tool to impart a slope to said slope sensor corresponding to the slope of said working tool.

* * * * *